(12) United States Patent
Yoshimori et al.

(10) Patent No.: US 10,719,281 B2
(45) Date of Patent: Jul. 21, 2020

(54) COMMUNICATION TERMINAL, METHOD OF CONTROLLING COMMUNICATION TERMINAL, AND NON-TRANSITORY COMPUTER-READABLE RECORDING MEDIUM THEREFOR

(71) Applicant: BROTHER KOGYO KABUSHIKI KAISHA, Nagoya-shi, Aichi (JP)

(72) Inventors: Satoshi Yoshimori, Nagoya (JP); Takafumi Kai, Nagoya (JP); Yu Matsuo, Nagoya (JP)

(73) Assignee: Brother Kogyo Kabushiki Kaisha, Nagoya-shi, Sichi-ken (JP)

( * ) Notice: Subject to any disclaimer, the term of this patent is extended or adjusted under 35 U.S.C. 154(b) by 0 days.

(21) Appl. No.: 16/421,972

(22) Filed: May 24, 2019

(65) Prior Publication Data

US 2019/0361645 A1 Nov. 28, 2019

(30) Foreign Application Priority Data

May 28, 2018 (JP) .................................. 2018-101157

(51) Int. Cl.
*H04N 1/00* (2006.01)
*G06F 3/12* (2006.01)
(Continued)

(52) U.S. Cl.
CPC .......... *G06F 3/1236* (2013.01); *G06F 3/1209* (2013.01); *G06F 3/1292* (2013.01); *H04W 4/80* (2018.02); *H04W 76/25* (2018.02)

(58) Field of Classification Search
CPC .... G06F 3/1209; G06F 3/1236; G06F 3/1292; H04W 76/25; H04W 4/80; H04L 61/2053; H04L 61/2092; H04L 61/2076
(Continued)

(56) References Cited

U.S. PATENT DOCUMENTS

2015/0249757 A1* 9/2015 Han .................... H04N 1/00307
358/1.15
2018/0035377 A1 2/2018 Ueda et al.

FOREIGN PATENT DOCUMENTS

JP 2018-026806 A 2/2018

* cited by examiner

*Primary Examiner* — Saeid Ebrahimi Dehkordy
(74) *Attorney, Agent, or Firm* — Scully, Scott, Murphy & Presser, PC

(57) ABSTRACT

A non-transitory computer-readable recording medium stores a set of program instructions for a communication terminal. The instructions cause, when executed by a processor of the communication terminal, the communication terminal to operate to obtain updated ID information and fixed ID information of a communication apparatus, and communicate with a communication apparatus based on the updated ID information. The updated ID information is periodically updated on the communication apparatus side, while the fixed ID information is not periodically updated. When the communication terminal is incapable of communicating with the communication apparatus based on the updated ID information, the updated ID information and the fixed ID information are obtained again from the communication apparatus. When the fixed ID information stored in storage coincides with the newly obtained fixed ID information, a communicating process of communicating with the communication apparatus is performed based on the newly obtained updated ID information.

9 Claims, 8 Drawing Sheets

(51) Int. Cl.
*H04W 4/80* (2018.01)
*H04W 76/25* (2018.01)

(58) Field of Classification Search
USPC ........................................................ 358/1.15
See application file for complete search history.

COMMUNICATION TERMINAL, METHOD OF CONTROLLING COMMUNICATION TERMINAL, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2018-101157 filed on May 28, 2018. The entire subject matter of the application is incorporated herein by reference.

BACKGROUND

Technical Field

The present disclosures relate to a communication terminal, a method of controlling the communication terminal, and a non-transitory computer-readable recording medium for the communication terminal.

Related Art

There has been known a communication terminal configured to communicate with a communication device in accordance with a various types of wireless communication methods. Among the various types of wireless communication methods, a BLE (i.e., Bluetooth® Low Energy) method has been widely used recently.

SUMMARY

According to aspects of the present disclosures, there is provided a non-transitory computer-readable recording medium storing a set of program instructions for a communication terminal which is provided with a communication interface and a storage, the communication interface being configured to communicate with a communication apparatus. The instructions cause, when executed by the processor, the communication terminal to perform a first obtaining process of obtaining, through the communication interface, updated ID information identifying the communication apparatus and fixed ID information identifying the communication apparatus, the updated ID information being periodically updated in the communication apparatus, the fixed ID information being not periodically updated in the communication apparatus, a first storage controlling process of storing the updated ID information and the fixed ID information obtained in the first obtaining process in the storage, a first determining process of determining whether the communication terminal is capable of communicating, through the communication interface, with the communication apparatus based on first updated ID information which is the updated ID information stored in the first storage controlling process, a first communication process of communicating, through the communication interface, with the communication apparatus based on the first updated ID information when it is determined, in the first determining process, that the communication terminal is capable of communicating with the communication apparatus, a second obtaining process of obtaining the updated ID information and the fixed ID information from the communication apparatus through the communication interface when it is determined, in the first determining process, that the communication terminal is incapable of communicating with the communication apparatus, a second determining process of determining whether the fixed ID information stored in the first storage controlling process and the fixed ID information obtained in the second obtaining process coincide with each other, and a second communicating process of communicating, through the communication interface, with the communication apparatus based on second updated ID information, which is the updated ID information obtained in the second obtaining process, when it is determined, in the second determining process, that the fixed ID information stored in the first storage controlling process and the fixed ID information obtained in the second obtaining process coincide with each other.

According to aspects of the present disclosures, there is provided a communication terminal which is provided with a communication interface, a storage, a processor, and a non-transitory computer-readable recording medium storing a set of program instructions to be executed by the processor. The processor is configured to execute the instructions and control the communication terminal to perform a first obtaining process of obtaining, through the communication interface, updated ID information identifying the communication apparatus and fixed ID information identifying the communication apparatus, the updated ID information being periodically updated in the communication apparatus, the fixed ID information being not periodically updated in the communication apparatus, a first storage controlling process of storing the updated ID information and the fixed ID information obtained in the first obtaining process in the storage, a first determining process of determining whether the communication terminal is capable of communicating, through the communication interface, with the communication apparatus based on first updated ID information which is the updated ID information stored in the first storage controlling process, a first communication process of communicating, through the communication interface, with the communication apparatus based on the first updated ID information when it is determined, in the first determining process, that the communication terminal is capable of communicating with the communication apparatus, a second obtaining process of obtaining the updated ID information and the fixed ID information from the communication apparatus through the communication interface when it is determined, in the first determining process, that the communication terminal is incapable of communicating with the communication apparatus, a second determining process of determining whether the fixed ID information stored in the first storage controlling process and the fixed ID information obtained in the second obtaining process coincide with each other, and a second communicating process of communicating, through the communication interface, with the communication apparatus based on second updated ID information, which is the updated ID information obtained in the second obtaining process, when it is determined, in the second determining process, that the fixed ID information stored in the first storage controlling process and the fixed ID information obtained in the second obtaining process coincide with each other.

According to aspects of the present disclosures, there is provided a method of controlling a communication terminal which is provided with a communication interface and a storage, the communication interface being configured to communicate with a communication apparatus. The method includes a first obtaining step of obtaining, through the communication interface, updated ID information identifying the communication apparatus and fixed ID information identifying the communication apparatus, the updated ID information being periodically updated in the communication apparatus, the fixed ID information being not periodically updated in the communication apparatus, a first storage controlling step of storing the updated ID information and the fixed ID information obtained in the first obtaining step in the storage, a first determining step of determining whether the communication terminal is capable of communicating, through the communication interface, with the communication apparatus based on first updated ID information which is the updated ID information stored in the first storage controlling step, a first communication step of communicating, through the communication interface, with the communication apparatus based on the first updated ID information when it is determined, in the first determining step, that the communication terminal is capable of communicating with the communication apparatus, a second obtaining step of obtaining the updated ID information and the fixed ID information from the communication apparatus through the communication interface when it is determined, in the first determining step, that the communication terminal is incapable of communicating with the communication apparatus, a second determining step of determining whether the fixed ID information stored in the first storage controlling step and the fixed ID information obtained in the second obtaining step coincide with each other, and a second communicating step of communicating, through the communication interface, with the communication apparatus based on second updated ID information, which is the updated ID information obtained in the second obtaining step, when it is determined, in the second determining step, that the fixed ID information stored in the first storage controlling step and the fixed ID information obtained in the second obtaining step coincide with each other.

BRIEF DESCRIPTION OF THE ACCOMPANYING DRAWINGS

DETAILED DESCRIPTION OF THE EMBODIMENTS

Figure 1:
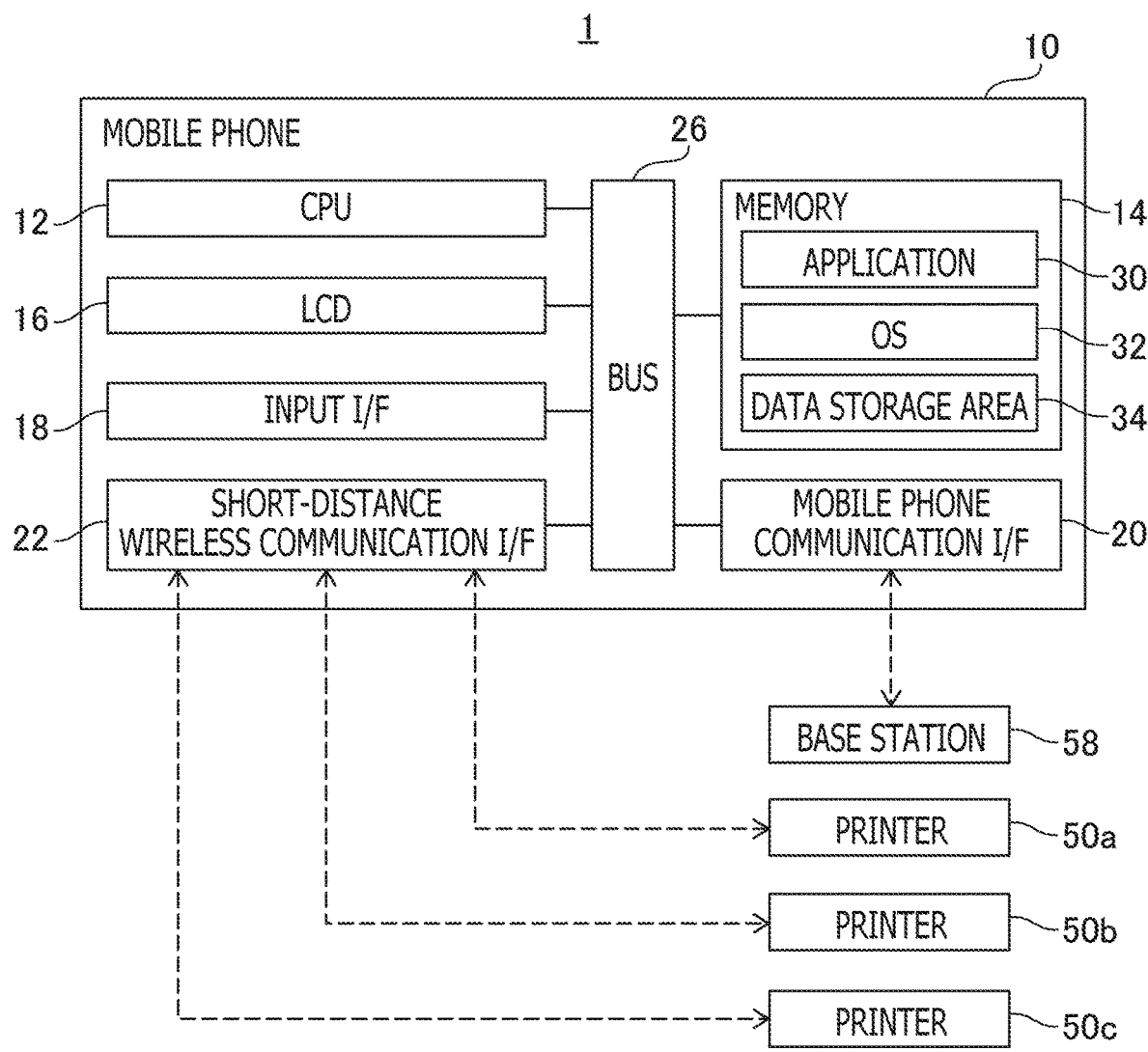
FIG. 1 is a block diagram of a communication system according to an embodiment of the present disclosures.

FIG. 1 is a block diagram of a communication system 1 according to an embodiment of the present disclosures. The communication system 1 includes a mobile phone (which is an example of a mobile terminal) 10, printers (which are examples of a communication device) 50a, 50b and 50c. In the following description, the printers 50a, 50b and 50c may be correctively referred to as a printer 50.

The mobile phone 10 mainly has a CPU (which is an example of a processor) 12, a memory 14, an LCD 16, an input I/F 18, a mobile phone communication I/F 20, a short-distance wireless communication I/F (which is an example of a communication I/F) 22. These components are configured to be communicate with each other through a bus 26.

The CPU 12 performs processes in accordance with application (which is an example of a program) 30 stored in the memory 14 and an OS 32. The application 30 is a program causing the CPU 12 to perform printing process of images, and the OS 32 is a program providing basic functions to be used by the application 30. It is noted that, in the following description, the CPU 12 performing the application 30 may also be referred to by a name of a program. For example, an expression "the application 30 performs . . . " may occasionally be used to express that "the CPU 12 executing the application 30 performs . . . " or "the application 30 causes the CPU 12 to perform . . . ."

The memory 14 includes a data storage area (which is an example of a storage) 34. The data storage area 34 serves as an area storing data which is necessary for executing the application 30. It is noted that the memory 14 may be configured by a combination of a RAM, a ROM, a flash memory, an HDD and/or a buffer provided to the CPU 12.

The memory 14 may be a computer-readable storage medium. The computer-readable storage medium is a non-transitory medium. Examples of the non-transitory medium are, besides the above-described memory 14, recording medium such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not categorized as the non-transitory computer-readable medium.

The LCD 16, which is a display of the mobile phone 10, is configured to display various pieces of information regarding the mobile phone 10. It is noted that the display of the mobile phone 10 need not be limited to the LCD, but other types of displays (e.g., an organic EL display) may be employed as the display of the mobile phone 10. The input I/F 18 includes keys for causing the mobile phone 10 to execute various functions. The input I/F 18 may be a touch panel integrally provided to the LCD 16 and be configured to receive user operations (e.g., touching operations) on icons displayed on the LCD 16.

The mobile phone communication I/F 20 is configured to execute a wireless communication with a base station 58 in accordance with a mobile phone communication method. Thus, when the mobile phone 10 is in a state of executing the wireless communication according to the mobile phone communication method, the mobile phone 10 can perform data communication with another device through the base station 58.

The short-distance wireless communication I/F 22 is configured to execute a wireless communication in accordance with a Bluetooth® Low Energy method (hereinafter, referred to as "a BLE communication") in accordance with the IEEE 802.15.1 standard and a standard compliant thereto. Thus, according to the embodiment, when the mobile phone 10 is in a state of executing the BLE communication, the mobile phone 10 can perform data communication with the printer 50.

In the specification, processes of the CPU 12 according to the instructions described in programs will be mainly described. That is, processes to "judge," "extract," "select," "calculate," "determine," "identify," "specify," "obtain," "receive," "control" and the like are those performed by the CPU 12. It is noted that the processes performed by the CPU 12 may include control of hardware through the OS 32. It is also noted that the term "obtain" is used to mean a concept which does not necessarily include a concept of requesting. That is, a process of the CPU 12 to receive data without requesting therefor is also included in a concept that "the CPU 12 obtains data."

Further, a term "data" in the specification is expressed by a computer-readable bit array. It is also noted that two pieces of data having substantially the same meaning but different formats are treated as the same data. "Information" in the specification is also treated in a same manner. Further, processes to "order," "respond," "request" and the like are performed by communicating (i.e., transmitting/receiving) information representing the processes to "order," "respond," "request" and the like, respectively. Further, a process to "set" is performed by storing input setting information.

According to the communication system 1, with the configuration described above, printing image data is transmitted, using the BLE communication, from the mobile phone 10 to the printer 50, and a printing process of images based on the printing image data is performed by the printer 50.

Figure 2:
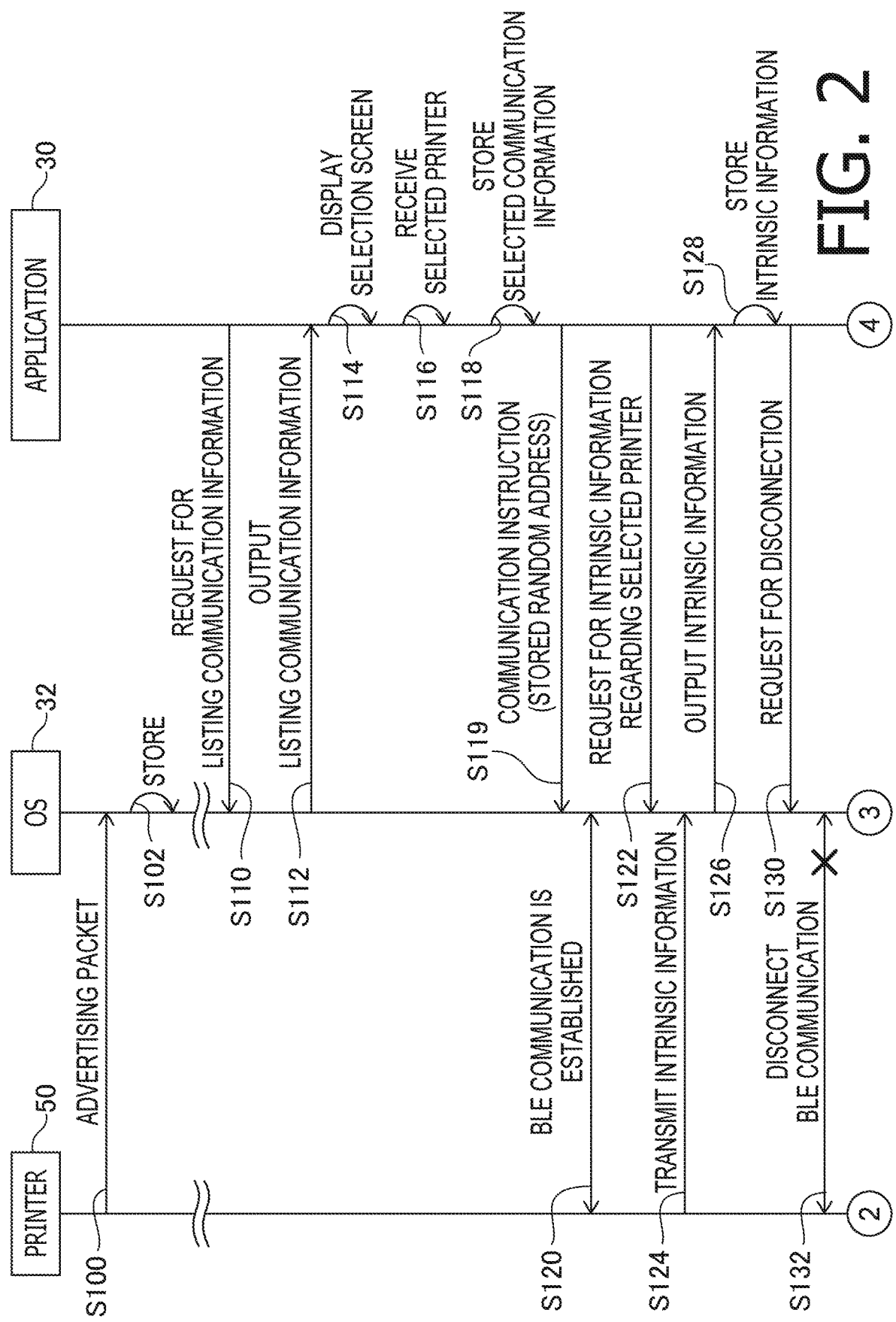
FIGS. 2-4 show a sequence chart of the communication system shown in FIG. 1.
Figure 3:
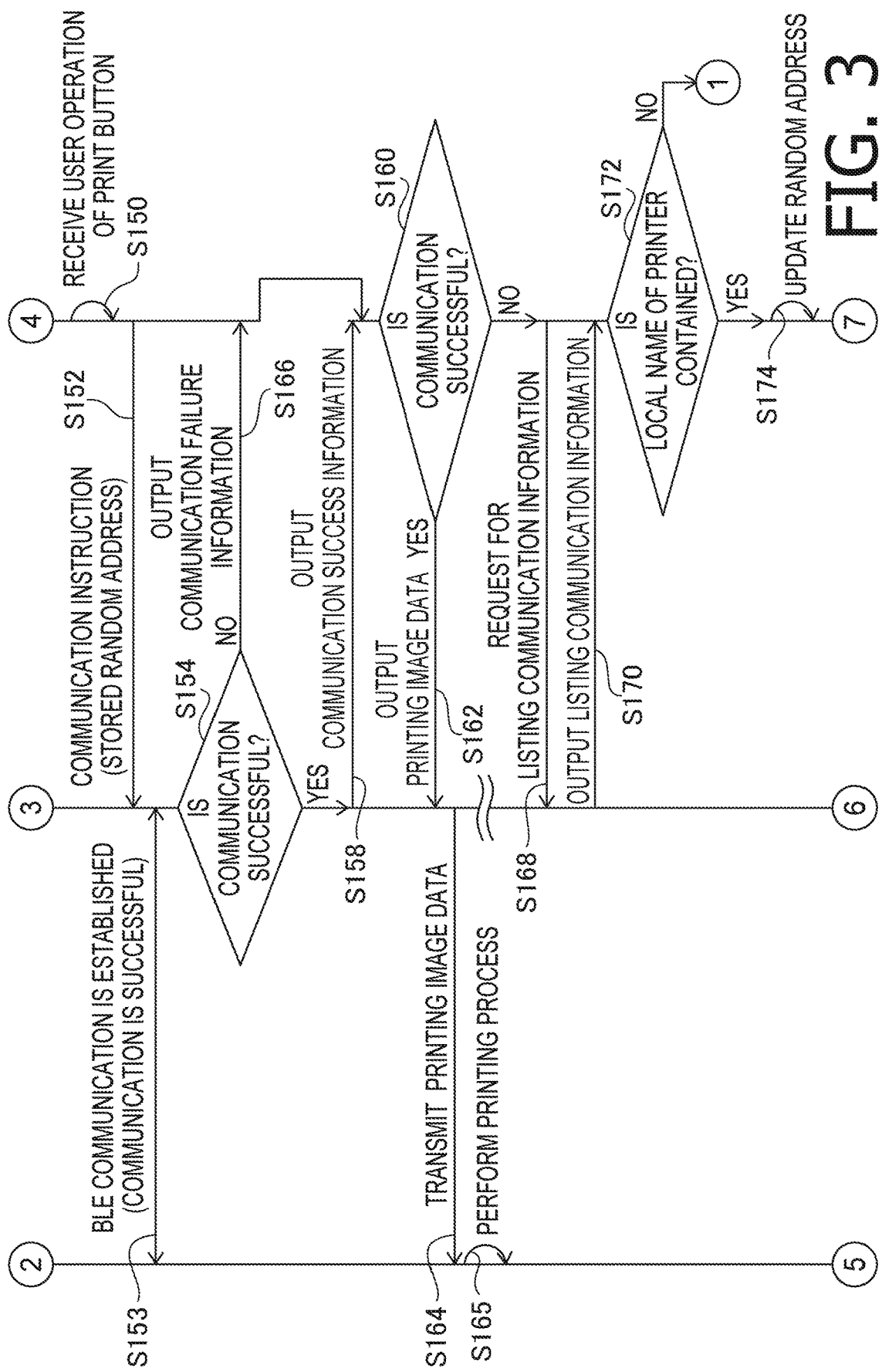
Figure 4:
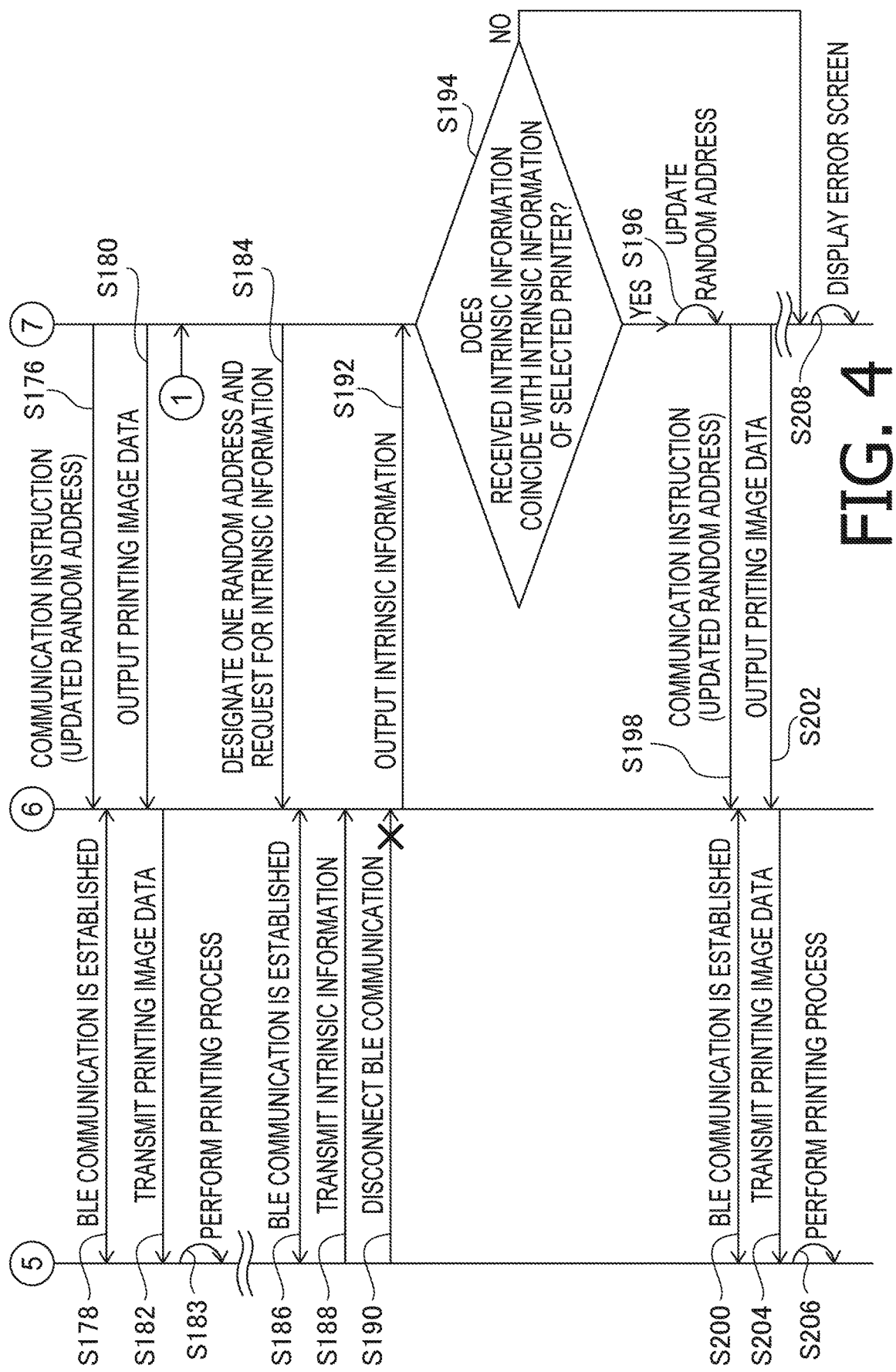

Referring to FIGS. 2-4, the process performed by the communication system 1 will be described in detail. It is firstly noted that the BLE communication is one of standards of the short-distance wireless communication. According to the BLE communication, a beacon signal, which is called as an advertising packet, is output by the printer 50. The advertising packet is a signal which is not transmitted to a particular device, but transmitted to many and unspecified devices simultaneously. In other words, the advertising packet is broadcast from the printer 50 to all the communicatable devices using the BLE communication.

The advertising packet includes a random address (which is an example of updated ID information) and a local name (which is an example of fixed ID information). The random address is used when the mobile phone 2 communicates with the printer 50 which outputs the advertising packet. The random address is periodically updated by the printer 50. For example, when 15 minutes have elapsed since a communication using the BLE communication was disconnected, the random address is updated. The local name is used to identify the printer 50 outputting the advertising packet. Unlike the random address, the local name is not periodically updated. It is noted, however, the local name is changeable by a user operation on the printer 50. In the following description, the random address and the local name contained in the advertising packet may be collectively referred to as communication information.

When the advertising packet is output from the printer 50 (FIG. 2: S100), if the mobile phone 10 is within a communicatable range of the BLE communication, the OS 32 of the mobile phone 10 receives the advertising packet through the short-distance wireless communication I/F 22. Then, the OS 32 stores the received advertising packet in the data storage rare 34 (S102). That is, the OS 32 stores the same in the data storage area 34 with associating the random address and the local name included in the advertising packet with each other.

When, for example, the OS 32 receives the advertising packets from the three printers 50a, 50b and 50c, respectively, the OS 32 stores the random address and the local name of each advertising packet, in an associated manner, in the data storage area 34. The printer 50 outputs the advertising packet at every particular period, and the OS 32 updates the random address and the local name in the data storage area 34 at every receipt of the advertising packet.

It is assumed, for example, a case where the printer 50a outputs the advertising packet containing a random address RA1 and a local name LN1. In response to receipt of the advertising packet, the OS 32 stores the random address RA1 and the local name LN1 in the data storage area 34 as the communication information of the printer 50a. Then, in the printer 50a, after a particular period (e.g., 15 minutes) has elapsed, the random address RA1 is updated to another random address RA2, and the advertising packet containing the updated random address RA2 and the local name LN1 is output from the printer 50a. When the OS 32 receives the updated advertising packet, the OS 32 updates the communication information of the printer 50a by replacing the random address RA1 and the local name LN1 stored in the data storage area 34 with the updated random address RA2 and the local name LN1.

As above, in the mobile phone 10, the advertising packets each containing the random address and the local name output by the respective printers 50 capable of performing the BLE communication with the mobile phone 10 are stored as the communication information of the respective printers 50. In the following description, a collection of pieces of communication information for respective printers 50, which is stored in the data storage area 34, will be referred to as listing communication information. When the application 30 is started, the application 30 requests the OS 32 for the listing communication information (S110). In response to the request from the application 10, the OS 32 outputs the listing communication information stored in the data storage area 34 to the application 30 (S112).

When receiving the listing communication information, the application 30 displays a selection screen on the LCD 16 based on the received listing communication information (S114). On the selection screen, the local names contained in the listing communication information are displayed. The user operates the input I/F 18 to select an arbitrary printer by its local name from among the local names displayed on the selection screen displayed on the LCD 16. For example, when the mobile phone 10 can communicate with the three printers 50a, 50b and 50c with the BLE communication, three local names respectively corresponding to the three printers 50a, 50b and 50c are displayed on the LCD 16. Then, the user operates the input I/F 18 to select one of the local names, thereby the printer corresponding to the selected local name being selected. As above, the application 30 receives the user operation to select one of the printers (S116). Hereinafter, the selected printer in S116 will be referred to as a "selected printer". Thereafter, the application 30 stores the random address and the local name contained in the communication information in the data storage area 34 as the communication information of the selected printer (hereinafter, referred to as selected-printer communication information) (S118). It should be noted that, in the following description, it is assumed that the selected printed is the printer 50a. When the application 30 transmits, to the OS 32, a connection request to the selected printer using the stored random address (S119), the OS 32 transmits the connection request to the selected printer and establishes the BLE communication with the selected printer (S120).

Next, the application 30 requests the OS 32 for intrinsic information (which is an example of intrinsic ID information) of the selected printer (S122). At this stage, the application 30 designates the random address which is stored in the selected communication information to request for the intrinsic information of the selected printer. It is noted that the intrinsic information includes a model name and a serial number of a target (i.e., designated) printer. Thus, the intrinsic information is unique and intrinsic information to the target printer. In other words, the intrinsic information is not periodically updated and non-rewritable information. When the OS 32 receives the request for the intrinsic information of the selected printer, the OS 32 obtains the intrinsic information from the selected printer (S124).

When the OS 32 has obtained the intrinsic information from the selected printer, the OS 32 outputs the intrinsic information to the application 30 (S126). When the application 30 has received the intrinsic information, the application 30 stores the received intrinsic information in the data storage area 34 in association with the selected-printer communication information (S128). That is, in the data storage area 34, the random address, the local name, the model name and the serial number of the selected printer are stores in an associated manner. When the application 30 stores the intrinsic data in the data storage area 34, the application 30 outputs a disconnection request to the OS 32 (S130). Then, the OS 32 disconnects the BLE communication with the selected printer (S132).

As described above, the application 30 is a program configured to perform a printing process to print images. Thus, the application 30 displays a printing process performing screen on the LCD 16 with a print button being displayed on the printing process performing screen. The print button is for starting the printing process. When the application 30 receives the user operation to operate the print button (FIG. 3: S150), the application 30 outputs an instruction which instructs to start the BLE communication using the random address contained in the selected-printer communication information stored in the memory 34 in S118 (hereinafter, referred to as the stored random address).

When the OS 32 receives the instruction to perform the BLE communication, the OS 32 attempts to perform the BLE communication with the selected printer using the stored random address. At this stage, when the BLE communication with the selected printer using the stored random address has been successfully performed, the BLE communication between the OS 32 and the selected printer is established (S153). Then, the OS 32 determines that the BLE communication with the selected printer using the stored random address has been successfully performed (S154: YES), and outputs communication success information indicating that the BLE communication with the selected printer is succeeded to the application 30 (S158).

When the application 30 receives information regarding the communication from the OS 32 after the application 30 outputs, in S152, the communication instruction to the OS 32, the application 30 determines whether the BLE communication with the selected printer has been performed successfully based on the received information (S160). At this stage, since the application 30 has received the communication success information from the OS 32, the application 30 determines the BLE communication with the selected printer has been performed successfully (S160: YES). Then, the application 30 outputs the printing image data to the OS 32 (S162). When the OS 32 receives the printing image data, the OS 32 transmits the printing image data, together with the print instruction, to the selected printer by the BLE communication (S164). As a result, in the selected printer, the printing process of images based on the printing image data transmitted from the mobile phone 10 is performed (S165).

There could be a case where, when the application 30 attempts the BLE communication with the selected printer using the stored random address in accordance with the communication instruction received from the application 30 (S152), the BLE communication with the selected printer is failed. Such a failure occurs since the random address is periodically updated in the printer. As aforementioned, when the selected printer output the advertising packet containing the random address RA1 and the local name LN1, the OS 32, which receives the advertising packet, stores the random address RA1 and the local name LN1 in the data storage area 34 in an associated manner as the listing communication information. Then, the application 30 obtains the listing communication information and stores the selected-printer communication information of the listing communication information in the data storage area 34. Because of the above configuration, the application 30 outputs the communication instruction using the random address RA1 of the selected-printer communication information to the OS 32, and the OS 32 attempts, in S154, the BLE communication with the selected printer using the random address RA1.

In the selected printer, however, due to the periodical update of the random address, there could be a case where the random address has been changed from RA1 to RA2. In such a case, when the stored random address is RA1, the BLE communication using the stored random address is failed (S154: NO). It is noted that, as aforementioned, there could be a case where the BLE communication is attempted using the stored random address and failed. Further, there could be another case where the BLE communication is failed as the BLE communication is not attempted and a particular period has elapsed. That is, the failure of the BLE communication includes a case where the BLE communication is attempted and filed, and another case where the BLE communication is not attempted and the particular period has elapsed. It is further noted that, when the BLE communication with the selected printer is failed (S154: NO), since the BLE communication with the printer 50 is not established and the process of S153 is not performed.

When the OS 32 fails to perform the BLE communication with the selected printer, the OS 32 outputs communication failure information indicating failure of the BLE communication with the selected printer to the application 30 (S166). Then, the application 30 determines whether the BLE communication with the selected printer is performed successfully based on the information received from the OS 32 (S160). At this stage, since the application 30 has received the communication failure information from the OS 32, the application 30 determines that the BLE communication with the selected printer is failed (S160: NO).

When the application 30 determines that the BLE communication with the selected printer is failed, the application 30 requests the OS 32 for the listing communication information again (S168). On the OS 32 side, the advertising packet is transmitted from the selected printer at every particular interval after the BLE communication was disconnected, and the listing communication information stored in the data storage area 34 has been updated based on the advertising packets transmitted from the selected printer. Therefore, when the random address of the selected printer has been changed from RA1 to RA2, the OS 32 must have received the advertising packet containing the updated random address RA2, and updated the listing communication information stored in the data storage area 34 based on the advertising packet. That is, when the OS 32 receives, in S168, a request for the listing communication information again, the listing communication information stored in the data storage area 34 has been updated such that the random address of the selected printer has been changed from RA1 to RA2. Accordingly, the OS 32 outputs the listing communication information containing the random address RA2 to the application 30 (S170).

When receiving the listing communication information, the application 30 determines whether the local name of the selected printer, that is, the local name stored as the selected-printer communication information is contained in the listing communication information (S172). At this stage, normally, it is determined that the local name contained in the selected-printer communication information is contained in the listing communication information. However, if the local name of the selected printer has been changed, it is determined that the local name contained in the selected-printer communication information is not contained in the listing communication information.

For example, when the selected printer outputs the advertising packet containing the random address RA1 and the local name LA1, the OS 32, when receiving the advertising packet, associates the random address RA1 and the local name LA1 with each other and stores the same in the data storage area 34 as the listing communication information. The application 30 then obtains the listing communication information and stores the selected-printer communication information contained in the listing communication information in the data storage area 34. Therefore, the application 30 stores the random address RA1 and the local name LN1 as the selected-printer communication information.

In the selected printer, when the random address RA1 and the local name N1 are updated to the random address RA2 and the local name LN2, respectively, the advertising packet containing the random address RA2 and the local name LN2 is transmitted. At this stage, in response to receipt of the advertising packet, the OS 32 updates the random address RA1 and the local name LN1 to the random address RA2 and the local name LN2 contained in the listing communication information stored in the data storage area 34.

Accordingly, if the application 30 determines whether the local name LN1 of the selected-printer communication information is contained in the received listing communication information when the application 30 receives the listing communication information from the OS 32 again, the application 30 determines that the local name LN1 is not contained in the listing communication information since, in the listing communication information, the updated local name LN2 is contained. In contrast, when the rewriting of the local name has not been performed in the selected printer, the application 30 determines that the local name LN1 of the selected-printer communication information is contained in the listing communication information.

As described above, when the local name LN1 of the selected-printer communication information is contained in the re-received listing communication information (S172: YES), it is confirmed that the updated random address RA2 is of the selected printer. Therefore, the application 30 updates the random address, which is stored as the selected-printer communication information, from RA1 to RA2 (S174). Then, the application 30 outputs an instruction to perform the BLE communication using the updated random address RA2 (FIG. 4, S176).

When the OS 32 receives the instruction to perform the BLE communication, the OS 32 attempts to perform the BLE communication using the updated random address RA2. That is, in the selected printer, after the random address is changed from the RA1 to the RA2, the BLE communication using the updated random address RA2 is performed. Then, the BLE communication is performed between the OS 32 and the selected printer. Next, the application 30 outputs the printing image data to the OS 32 (S180). Then, the OS 32 transmits the printing image data to the selected printer, using the BLE communication, together with the printing instruction (S182). Accordingly, in the selected printer, the printing process of images based on the printing image data transmitted from the mobile phone 10 is performed (S183).

When it is determined that the local name LN1 of the selected-printer communication information is not contained in the re-received listing communication information (S172: NO), it is not confirmed, by the local name LN1, that the updated random address RA1 is of the selected printer. Therefore, the application 30 confirms that the updated random address RA2 is of the selected printer by using the intrinsic information stored together with the selected-printer communication information.

Concretely, the application 30 designates one of all the random addresses contained in the listing communication information obtained in S170 and requests the OS for the intrinsic information of the printer communicatable with the mobile phone 10 (S184). When the OS 32 receives the intrinsic information, the OS 32 establish the BLE communication with the printer having the designated random address (S186) to obtain the intrinsic information from the printer (S188). Then, the OS 32 outputs the intrinsic information of the printer to the application 30 (S192). After obtaining the intrinsic information from the printer, the OS 32 disconnects the BLE communication (S190).

When the application 30 receives the intrinsic information from the OS 32, the application 30 determines whether the intrinsic information of the selected printer coincides with the received intrinsic information (S194). That is, the application determines whether the intrinsic information stored in the data storage area 34 together with the selected-printer communication information coincides with the received intrinsic information. The intrinsic information is, as described above, information containing the model name and the serial number. The intrinsic information is not periodically updated or cannot be rewritten. Accordingly, when the intrinsic information of the selected printer coincides with the received intrinsic information, it is confirmed that the random address designated when the intrinsic information is requested (i.e., the updated random address RA2) is of the selected printer. Therefore, when the intrinsic information of the selected printer coincides with the received intrinsic information (S194: YES), the application 30 updates the random address stored as the selected-printer communication information from RA1 to RA2 (S196f). Then, the application 30 outputs the instruction to perform the BLE communication using the updated random address RA2 (S198).

When the OS 32 receives the instruction to perform the BLE communication, the OS 32 attempts to perform the BLE communication with the selected printer using the updated random address RA2. Thus, the BLE communication is established between the OS 32 and the selected printer (S200). Then, the application 30 outputs the printing image data to the OS 32 (S202), and the OS 32 transmits the received printing image data, together with the print instruction, to the selected printer using the BLE communication (S204). Then, in the selected printer, the printing process of images based on the printing image data transmitted from the mobile phone 10 is performed (S206).

When the intrinsic information of the selected printer does not coincide with the received intrinsic information and when the intrinsic information for all the addresses contained in the listing communication information obtained in S170 has not been obtained, the process returns to S184. When the intrinsic information of the selected printer does not coincides with the received intrinsic information and the intrinsic information for all the random addresses contained in the listing communication information obtained in S170 has been obtained (S194: NO), it is assumed, for example, that the mobile phone 10 is located outside the communicatable range of the BLE communication of the selected printer and thus the BLE communication with the selected printer cannot be performed. Accordingly, when the intrinsic information of the selected printer is not contained in the received intrinsic information, the application 30 displays, for example, an error screen is displayed on the LCD 16 (S208) to notify the user that the print process by the selected printer cannot be performed.

As above, in the mobile phone 10, when the BLE communication with the selected printer cannot be established using the periodically updated random address, the updated random address is obtained and it is determined whether the updated random address is of the selected printer using the local name, which is not periodically updated. Thus, even when the random address has been periodically updated in the printer, the mobile phone 10 can establish the BLE communication with the printer.

It is noted that the random address and the local name are included in the advertising packet which is periodically transmitted from the printer 50 according to the ordinary BLE communication technique, the mobile phone 10 can easily obtain the same. Therefore, using the existing information, the mobile phone 10 can establish the BLE communication with the printer of which random address has been updated.

There could be a case where the local name is rewritten in the printer 50. In such a case, whether or not the updated random address is of the selected printer is checked based on the intrinsic information which cannot be rewritten. Accordingly, even if the local name has been changed in the printer, it is possible that the mobile phone 10 establishes the BLE communication with the printer.

Figure 5:
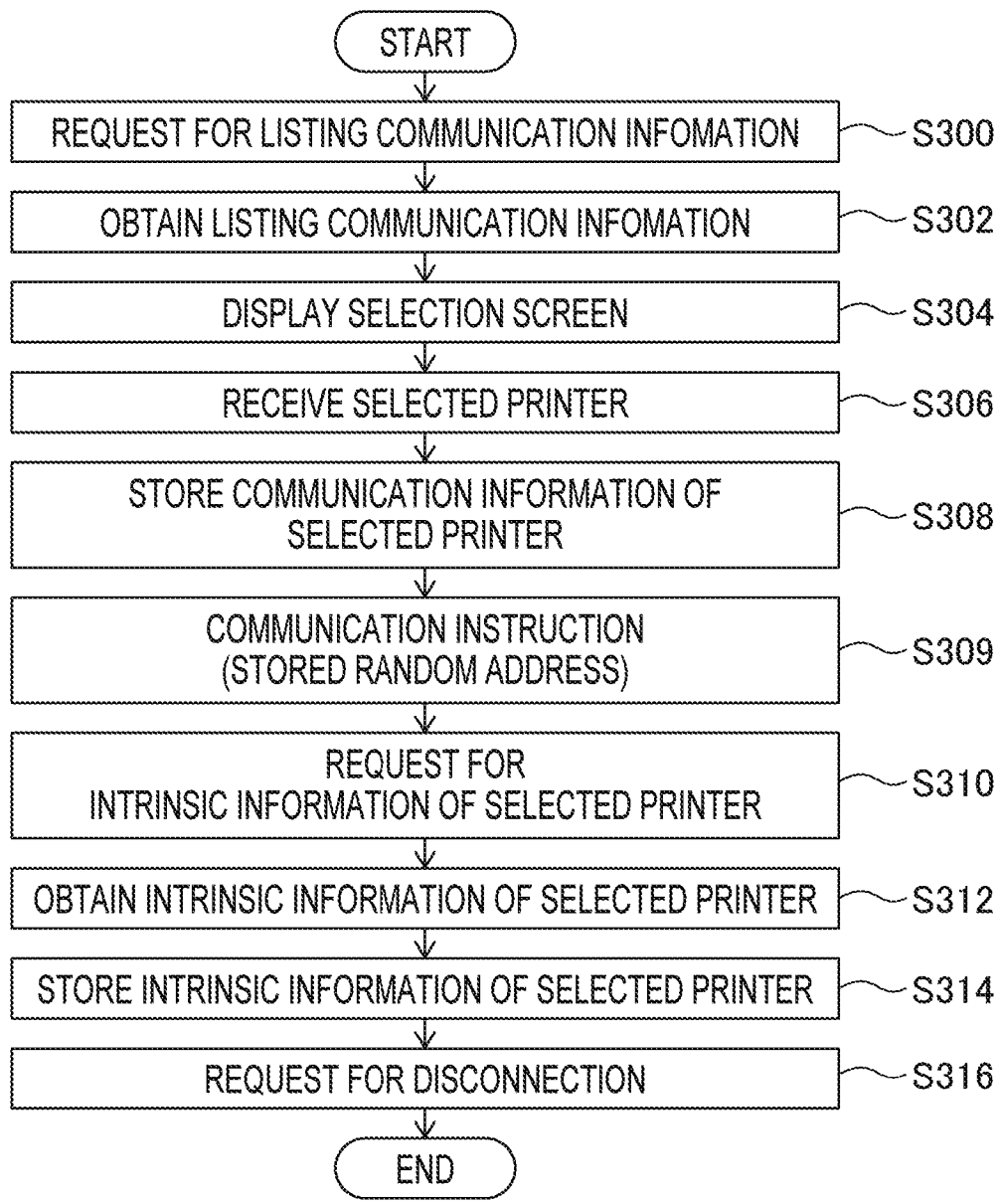
FIG. 5 is a flowchart illustrating a process performed by an application stored in a mobile phone of the communication system shown in FIG. 1.

The above-described process of the application 30 is performed as the application 30 is executed by the CPU 12 of the mobile phone 10. The processes performed when the application 30 is executed by the CPU 12 will be described in detail, referring to FIGS. 5-7. It is noted that the processes shown in FIGS. 5-7 are started in response to the startup of the application 30.

Firstly, when the application 30 is started, the application 30 requests the OS 32 for the listing communication information (S300 of FIG. 5) and obtains the listing communication information from the OS 32 (S302). Next, the application 30 displays the selection screen on the LCD 16 (S304) based on the local names contained in the listing communication information. Next, the application 30 receives the user's operation to select a printer (S306) and stores the communication information of the selected printer in the data storage area 34 (S308).

Next, the application 30 outputs the communication instruction instructing the communication with the selected printer using the random address contained in the communication information to the OS 32 (S309). Then, the application 30 requests the OS 32 for the intrinsic information of the selected printer (S310) and obtains the intrinsic information of the selected printer (S312). Next, the application 30 stores the obtained intrinsic information of the selected printer in the data storage area 34 in association with the selected-printer communication information (S314). Then, the application 30 outputs the disconnection request to the OS 32 (S316) and terminates the process shown in FIG. 5.

Figure 6:
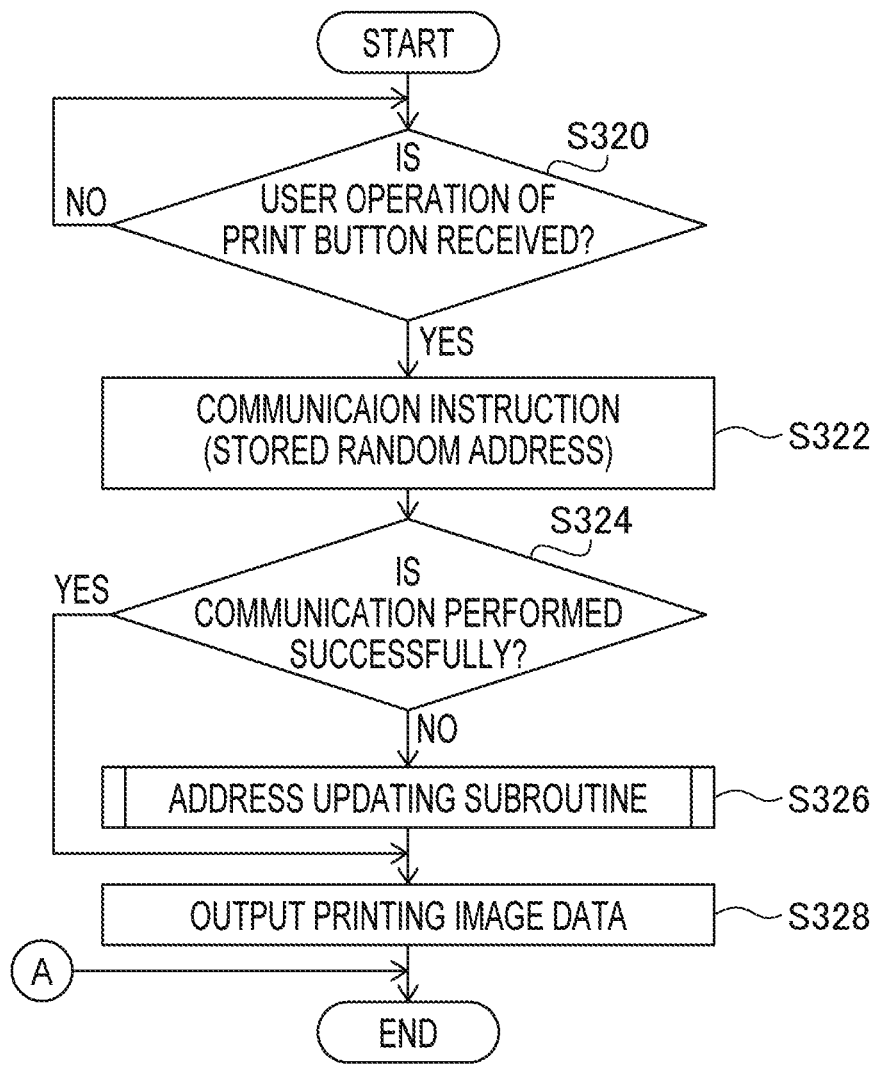
FIG. 6 is a flowchart illustrating a process performed by the application stored in the mobile phone of the communication system shown in FIG. 1.
Figure 7:
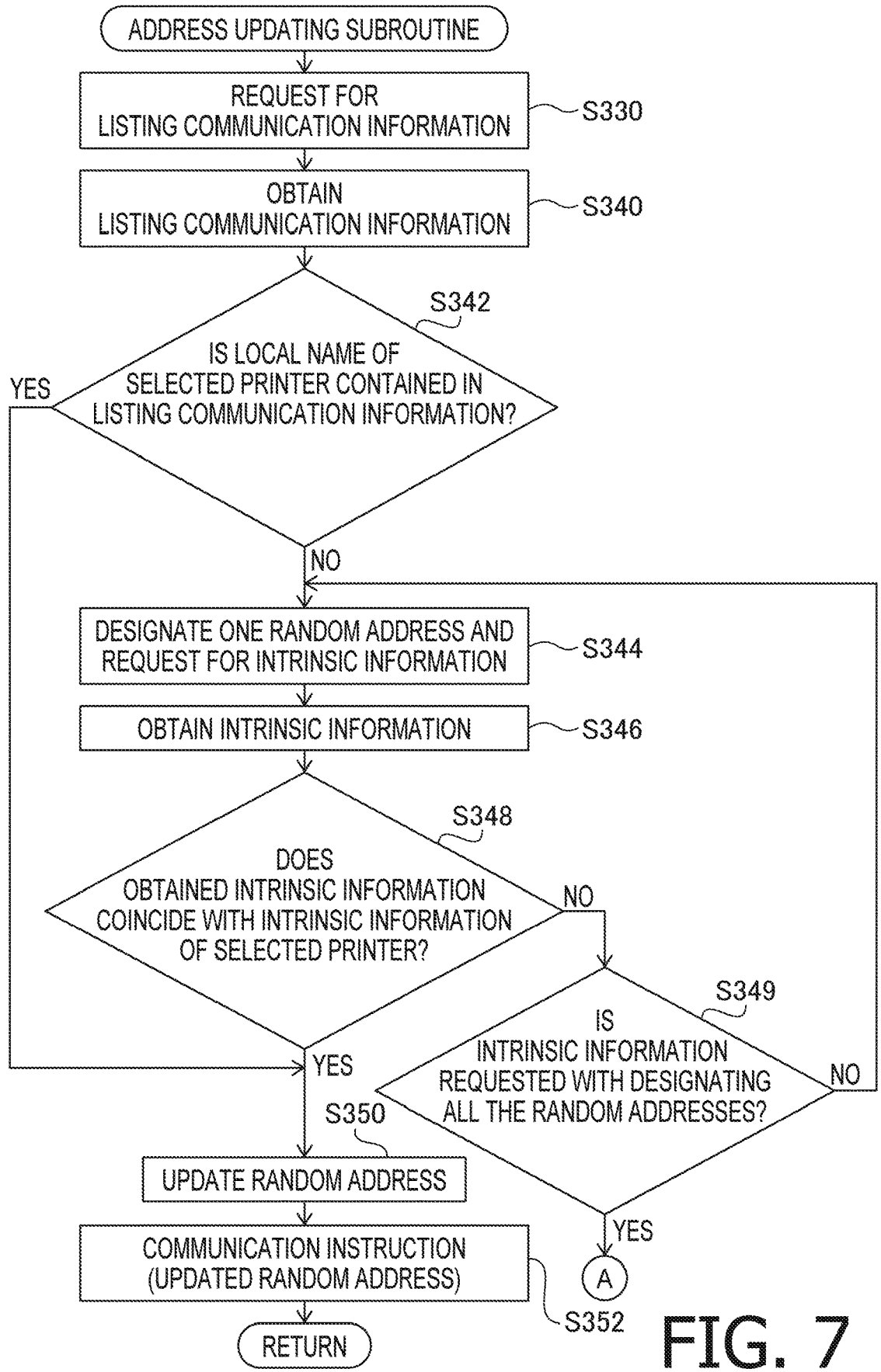
FIG. 7 is a flowchart illustrating an address updating subroutine performed by the application stored in the mobile phone of the communication system shown in FIG. 1.
Figure 8:
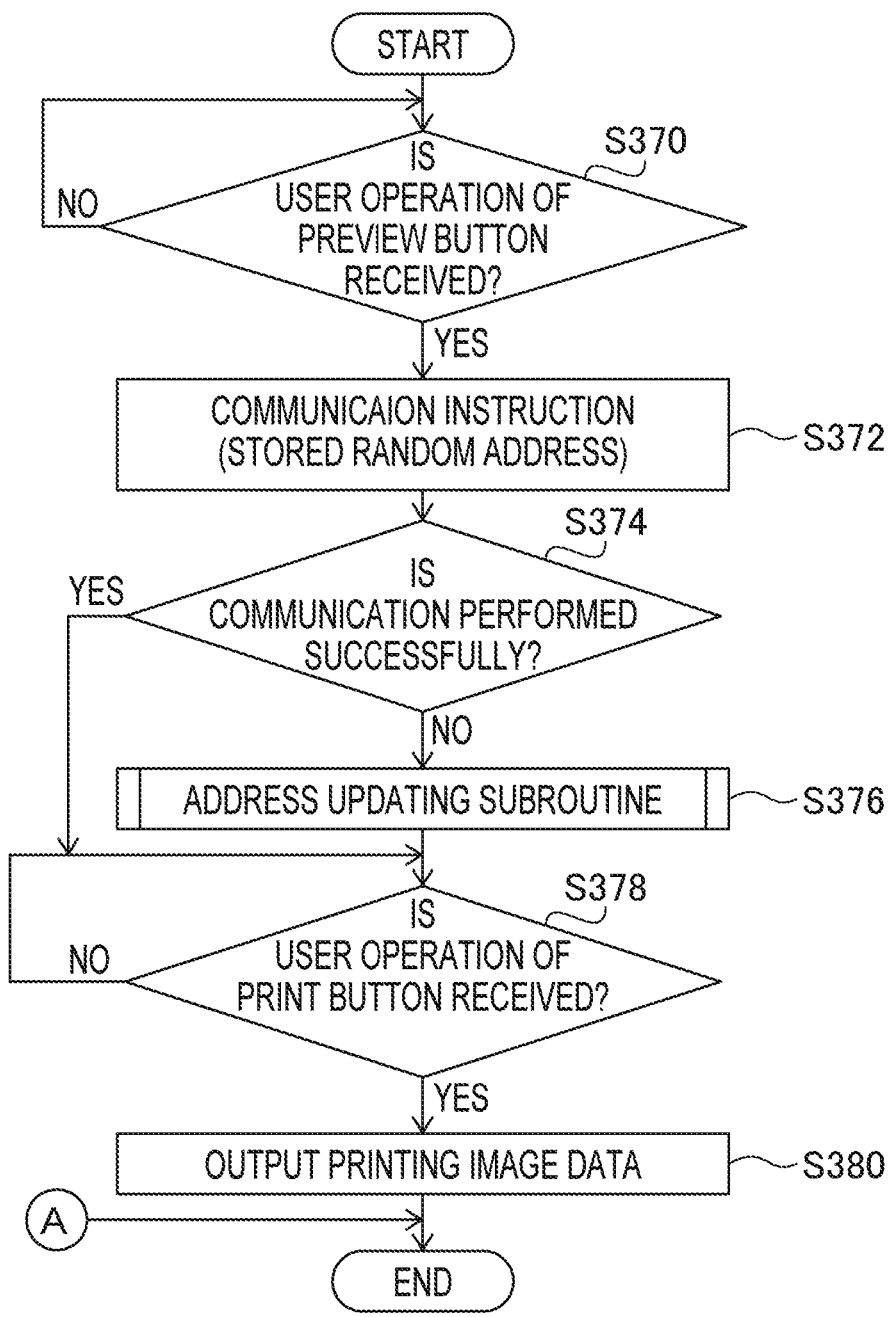
FIG. 8 is a flowchart illustrating a modified process performed by the application stored in the mobile phone of the communication system shown in FIG. 1.

When the application 30 is started, the application 30 determines whether the operation of the print button is received (S320 of FIG. 6). When the application 30 has not received the operation of the print button (S320: NO), the application 30 repeats the process of S320. When it is determined that the operation of the print button is received (S320: YES), the application 30 outputs the instruction to perform the BLE communication using the stored random address (S322).

Next, the application 30 determines whether the BLE communication with the selected printer has been performed successfully (S324). When the application 30 has received the communication success information from the OS 32, it is determined that the BLE communication with the selected printer has been successfully performed (S324: YES), and the application 30 outputs the printing image data to the OS 32 (S328). Then, the process shown in FIG. 6 is terminated.

When it is determined that the application 30 has received the communication failure information from the OS 32, it is determined that the BLE communication with the selected printer has been failed (S324: NO), and an address updating subroutine is executed (S326). In the address updating subroutine, the application 30 requests the OS 32 for the listing communication information (FIG. 7: S330) and obtains the listing communication information from the OS 32 (S340).

Next, the application 30 determines whether the local name of the selected printer (i.e., the local name of the selected-printer communication information stored in the data storage area 34) is contained in the listing communication information obtained in S340 (S342). When the local name of the selected printer is not contained in the listing communication information (S342: NO), the application designated one of all the random addresses contained in the listing communication information and request the OS 32 for the intrinsic information (S344) and obtains the intrinsic information from the OS 32 (S346). Then, the application 30 determines whether the intrinsic information of the selected printer (i.e., the intrinsic information stored in the data storage area 34 in association with the selected-printer communication information) coincide with the intrinsic information obtained in S346 (S348).

When the intrinsic information of the selected printer dose not coincide with the intrinsic information obtained in S346 (S348: NO), the application determines whether the intrinsic information has been requested by designating all the random addresses contained in the listing communication information (S349). When it is determined that the intrinsic information has not been requested by designated all the random addresses contained in the listing communication information (S349: NO), the application 30 returns to S344. When it is determined that the intrinsic information has been requested by designating all the random addresses contained in the listing communication information (S349: YES), the application 30 terminates the address updating subroutine (i.e., the flowchart shown in FIG. 7).

When it is determined that the intrinsic information of the selected printer coincides with the intrinsic information obtained in S346 (S348: YES), the application 30 updates the random address of the selected-printer communication information stored in the data storage area 34 to the random address obtained in S332 (S350). Then, the application 30 outputs the instruction to perform the BLE communication using the updated address to the OS 32 and terminates the address updating subroutine.

When it is determined that the local name of the selected printer is contained in the listing communication information (S342: YES), the application 30 performs the processes of S350 and S352, and terminates the address updating subroutine.

When the address updating subroutine is terminated, the application 30 outputs, in the main routine, the printing image data to the OS 32 (S328 of FIG. 6) and terminates the process shown in FIG. 6.

It is noted that the process of S302 executed by the CPU 12 is an example of a first obtaining process. The process of S308 is an example of a first storage controlling process. The process of S312 is an example of a third obtaining process. The process of S314 is an example of a second storage controlling process. The process of S324 is an example of a first determining process. The process of S328 is an example of a first communicating process, an example of a second communicating process and an example of a third communicating process. The process of S330 is a second obtaining process. The process of S346 is an example of a fourth obtaining process.

It is noted that aspects of the present disclosures need not be limited to configurations of the above-described embodiment. The configurations of the above-describe embodiment could be modified/improved in various ways in accordance with knowledge of the person skilled in the art, and embodied in various ways without departing from aspects of the present disclosures.

According to the above-described embodiment, whether or not the BLE communication using the stored random address can be performed is determined (S324) when the print button is operated (S320: YES). The configuration may be modified such that whether or not the BLE communication using the stored random address can be performed when the particular input with respect to the image subjected to be printed is received, before the print button is operated. Further, in such a case, in the address updating subroutine, the re-request of the listing communication information (S330) may be executed, before the print button is operated.

For example, when the application 30 receives a user operation of a preview button enabling the user to view a preview of the image as a particular input with respect to the image subjected to be printed (S370: YES), the application output the instruction to perform the BLE communication using the stored random address to the OS 32 (S372). Next, the application 30 determines whether the BLE communication using the stored random address has been successfully performed (S374). After the listing communication information is re-requested (S330 of FIG. 7) in the address updating subroutine in S376, it is determined whether the print button is operated (S378). When it is determined that the print button is operated (S378: YES), the printing image data is output to the OS 32 (S380).

When re-requesting of the listing communication information is performed before the print button is operated, the random address of the selected-printer communication information is updated as the listing communication information is re-requested (S350 of FIG. 7). That is, before the print button is operated, the updated random address with which the BLE communication can be performed with the selected printer is obtained. Accordingly, after the print button is operated, it immediately becomes possible to perform the BLE communication with the selected printer. It is noted that the process of S370 executed by the CPU 12 is an example of a second receiving process, and the process of S378 executed by the CPU 12 is an example of a first receiving process.

In the above-describe embodiment, the printer 50 is described to be a target device with which the BLE communication of the mobile phone 10 is performed. However, aspects of the present disclosures need not be limited to such a configuration and a device performing an image processing (e.g., a scanning) may be the target device with which the mobile phone 10 performs the BLE communication. Further, the target device need not be limited to ones performing the image processing but any of devices configured to perform various other processes may be the target device with which the BLE communication is performed.

According to the above-described embodiment, the printing image data is transmitted to the printer together with the print instruction by the established BLE communication. This configuration may be modified such that various pieces of information/data may be transmitted to the printer by the BLE communication besides the printing image data.

According to the above-described embodiment, the BLE communication is employed as a communication method. However, aspects of the present disclosures do not limit the communication method to the BLE communication. Any communication method using randomly updates addresses may be employed.

According to the above-described embodiment, an example in which the processes shown in FIGS. 2-8 performed by the CPU 12 is described. It is noted that the processes may be performed by ASIC, another logical integrated circuits or a combination of the CPU, ASIC and the other logical integrated circuit.

What is claimed is:

1. A non-transitory computer-readable recording medium storing a set of program instructions for a communication terminal which is provided with a communication interface and a storage, the communication interface being configured to communicate with a communication apparatus,
   wherein the instructions cause, when executed by the processor, the communication terminal to perform:
   a first obtaining process of obtaining, through the communication interface, updated ID information identifying a communication apparatus and fixed ID information identifying the communication apparatus, the updated ID information being periodically updated in the communication apparatus, the fixed ID information being not periodically updated in the communication apparatus;
   a first storage controlling process of storing the updated ID information and the fixed ID information obtained in the first obtaining process in the storage;
   a first determining process of determining whether the communication terminal is capable of communicating, through the communication interface, with the communication apparatus based on first updated ID information which is the updated ID information stored in the first storage controlling process;
   a first communication process of communicating, through the communication interface, with the communication apparatus based on the first updated ID information when it is determined, in the first determining process, that the communication terminal is capable of communicating with the communication apparatus;
   a second obtaining process of obtaining the updated ID information and the fixed ID information from the communication apparatus through the communication interface when it is determined, in the first determining process, that the communication terminal is incapable of communicating with the communication apparatus;
a second determining process of determining whether the fixed ID information stored in the first storage controlling process and the fixed ID information obtained in the second obtaining process coincide with each other; and
a second communicating process of communicating, through the communication interface, with the communication apparatus based on second updated ID information, which is the updated ID information obtained in the second obtaining process, when it is determined, in the second determining process, that the fixed ID information stored in the first storage controlling process and the fixed ID information obtained in the second obtaining process coincide with each other.

2. The non-transitory computer-readable recording medium according to claim 1, wherein the instructions further cause, when executed by the processor, the communication terminal to perform a requesting process of requesting for connection with the communication apparatus based on the first updated ID information stored in the first storage controlling process, and
wherein, in the first determining process, it is determined that the communication terminal is capable of communicating with the communication apparatus when the connection requested in the requesting process is established and it is determined that the communication terminal is incapable of communicating with the communication apparatus when the connection requested in the requesting process is not established.

3. The non-transitory computer-readable recording medium according to claim 1,
wherein the fixed ID information is rewritable information,
wherein the instructions further cause, when executed by the processor, the communication terminal to perform:
a third obtaining, through the communication interface, process of obtaining intrinsic ID information from the communication apparatus based on the first updated ID information, the intrinsic ID information being non-rewritable information and ID information intrinsic to the communication apparatus;
a second storage controlling process of storing the intrinsic ID information obtained in the third obtaining process in the storage in association with the first updated ID information and the fixed ID information stored in the first storage controlling process;
when it is determined, in the second determining process, that the fixe ID information stored in the first storage controlling process does not coincide with the fixed ID information obtained in the second obtaining process, a fourth obtaining process of obtaining, through the communication interface, the intrinsic ID information again from the communication apparatus based on second updated ID information which is obtained in the second obtaining process together with the fixed ID information; and
when the intrinsic ID information obtained in the fourth obtaining process coincides with the intrinsic ID information stored in the second storage controlling process, a third communicating process of communicating with the communication apparatus through the communication interface based on the second updated ID information used in the fourth obtaining process.

4. The non-transitory computer-readable recording medium according to claim 1,
wherein the instructions further cause, when executed by the processor, the communication terminal to:
perform a first receiving process of receiving a user operation to make the communication apparatus perform a particular process; and
perform, when the user operation is received in the first receiving process, a transmitting process of transmitting an execution instruction of the particular process to the communication apparatus during a communication with the communication apparatus in performed one of the second communicating process and the third communicating process; and
wherein, in the second obtaining process, the updated ID information and the fixed ID information are obtained again, through the communication interface, from the communication apparatus before receipt of the user operation in the first receiving process.

5. The non-transitory computer-readable recording medium according to claim 4,
wherein the instructions further cause, when executed by the processor, the communication terminal to:
receive, in the first receiving process, the user operation to make the communication apparatus perform an image processing as the particular process,
wherein the instructions further cause, when executed by the processor, the communication terminal to perform a second receiving process of receiving a particular input with respect to an image as the user operation, and
wherein, in the first determining process, it is determined whether the communication terminal is capable of communication with the communication apparatus when the user operation is received in the second receiving process.

6. The non-transitory computer-readable recording medium according to claim 1,
wherein the communication interface is configured to execute a communication in accordance with a Bluetooth® Low Energy method, and
wherein the fixed ID information is information contained in an advertising packet transmitted from the communication apparatus.

7. The non-transitory computer-readable recording medium according to claim 6,
wherein, in the first obtaining process and the second obtaining process, the updated ID information and the fixed ID information contained in the advertising packet received from the communication apparatus are requested to an operating system running on the communication terminal and the updated ID information and the fixed ID information are received as a response to the request to the operating system, and
wherein, in the second determining process, it is determined whether there exists coinciding fixed ID information which coincides with the fixed ID information stored in the first storage controlling process from among the fixed ID information obtained in the second obtaining process, and
wherein, when there exists the coinciding fixed ID information, the second communication process is performed based on the updated ID information which is contained in the advertising packet together with the coinciding fixed ID information.

8. A communication terminal, comprising:
a communication interface;
a storage;
a processor; and a non-transitory computer-readable recording medium storing a set of program instructions to be executed by the processor, the processor being configured to execute the instructions and control the communication terminal to perform:

a first obtaining process of obtaining, through the communication interface, updated ID information identifying the communication apparatus and fixed ID information identifying the communication apparatus, the updated ID information being periodically updated in the communication apparatus, the fixed ID information being not periodically updated in the communication apparatus;

a first storage controlling process of storing the updated ID information and the fixed ID information obtained in the first obtaining process in the storage;

a first determining process of determining whether the communication terminal is capable of communicating, through the communication interface, with the communication apparatus based on first updated ID information which is the updated ID information stored in the first storage controlling process;

a first communication process of communicating, through the communication interface, with the communication apparatus based on the first updated ID information when it is determined, in the first determining process, that the communication terminal is capable of communicating with the communication apparatus;

a second obtaining process of obtaining the updated ID information and the fixed ID information from the communication apparatus through the communication interface when it is determined, in the first determining process, that the communication terminal is incapable of communicating with the communication apparatus;

a second determining process of determining whether the fixed ID information stored in the first storage controlling process and the fixed ID information obtained in the second obtaining process coincide with each other; and a second communicating process of communicating, through the communication interface, with the communication apparatus based on second updated ID information, which is the updated ID information obtained in the second obtaining process, when it is determined, in the second determining process, that the fixed ID information stored in the first storage controlling process and the fixed ID information obtained in the second obtaining process coincide with each other.

9. A method of controlling a communication terminal which is provided with a communication interface and a storage, the communication interface being configured to communicate with a communication apparatus, the method comprising:

a first obtaining step of obtaining, through the communication interface, updated ID information identifying the communication apparatus and fixed ID information identifying the communication apparatus, the updated ID information being periodically updated in the communication apparatus, the fixed ID information being not periodically updated in the communication apparatus;

a first storage controlling step of storing the updated ID information and the fixed ID information obtained in the first obtaining step in the storage;

a first determining step of determining whether the communication terminal is capable of communicating, through the communication interface, with the communication apparatus based on first updated ID information which is the updated ID information stored in the first storage controlling step;

a first communication step of communicating, through the communication interface, with the communication apparatus based on the first updated ID information when it is determined, in the first determining step, that the communication terminal is capable of communicating with the communication apparatus;

a second obtaining step of obtaining the updated ID information and the fixed ID information from the communication apparatus through the communication interface when it is determined, in the first determining step, that the communication terminal is incapable of communicating with the communication apparatus;

a second determining step of determining whether the fixed ID information stored in the first storage controlling step and the fixed ID information obtained in the second obtaining step coincide with each other; and a second communicating step of communicating, through the communication interface, with the communication apparatus based on second updated ID information, which is the updated ID information obtained in the second obtaining step, when it is determined, in the second determining step, that the fixed ID information stored in the first storage controlling step and the fixed ID information obtained in the second obtaining step coincide with each other.

* * * * *

UNITED STATES PATENT AND TRADEMARK OFFICE
CERTIFICATE OF CORRECTION

PATENT NO. : 10,719,281 B2
APPLICATION NO. : 16/421972
DATED : July 21, 2020
INVENTOR(S) : Satoshi Yoshimori It is certified that error appears in the above-identified patent and that said Letters Patent is hereby corrected as shown below:

On the Title Page

(73) Assignee: should read:
Brother Kogyo Kabushiki Kaisha,
Nagoya-shi, Aichi-ken, (JP)

Signed and Sealed this
Seventeenth Day of November, 2020

Andrei Iancu
*Director of the United States Patent and Trademark Office*